US006893185B1

(12) United States Patent
Wood

(10) Patent No.: US 6,893,185 B1
(45) Date of Patent: May 17, 2005

(54) DEFORMABLE WEDGE CLAMP ASSEMBLY

(75) Inventor: Mark W. Wood, Jackson, TN (US)

(73) Assignee: DeVilbiss Air Power Company, Jackson, TN (US)

( * ) Notice: Subject to any disclaimer, the term of this patent is extended or adjusted under 35 U.S.C. 154(b) by 84 days.

(21) Appl. No.: 10/323,074

(22) Filed: Dec. 18, 2002

Related U.S. Application Data

(60) Provisional application No. 60/344,147, filed on Dec. 27, 2001.

(51) Int. Cl.[7] .............................................. F16B 2/14
(52) U.S. Cl. ............................... 403/374.4; 403/374.1; 403/374.2; 403/374.3; 403/409.1
(58) Field of Search ................................ 403/279–281, 403/350, 362, 379.1–379.4, 400, 409.1; 248/56, 248/65.73, 222.14, 74.1

(56) References Cited

U.S. PATENT DOCUMENTS

| | | | | | |
|---|---|---|---|---|---|
| 5,404,769 A | * | 4/1995 | Kao | ........................... | 403/351 |
| 5,507,746 A | * | 4/1996 | Lin | ........................... | 403/400 |
| 5,842,385 A | * | 12/1998 | Su | ........................... | 403/351 |
| 5,913,634 A | * | 6/1999 | Heilig | ..................... | 403/374.1 |

* cited by examiner

Primary Examiner—Robert J. Sandy
Assistant Examiner—Ruth C. Rodriguez
(74) Attorney, Agent, or Firm—Suiter West PC LLO

(57) ABSTRACT

A deformable wedge clamp assembly includes a body having first and second apertures formed therein, the first aperture being suitable for receiving a fastener and the second aperture being suitable for receiving a member to which the body is to be attached and a wedge assembly disposed in the body adjacent to the first and second apertures, wherein insertion of a fastener into the first aperture is capable of deforming the body for moving the wedge assembly against a member received in the first aperture to clamp the body to the member.

16 Claims, 4 Drawing Sheets

DEFORMABLE WEDGE CLAMP ASSEMBLY

This application claims the benefit of provisional application 60/344,147, filed Dec. 27, 2001.

FIELD OF THE INVENTION

The present invention generally relates to the field of clamping devices, and more particularly to a clamp assembly employing a deformable wedge assembly for securing members such as shafts, bearing assemblies, and the like.

BACKGROUND OF THE INVENTION

Common devices for clamping a component to cylindrical members such as shafts, bearing assemblies, and the like, include radial set screws, split collar circumferential clamps, clamps utilizing a taper with an axial retention bolt, and clamps using an angled wedge lock. However, such devices are often not completely suitable for many clamping applications. For instance, clamping devices such as radial set screws and angled wedge locks create stress concentrations that may cause failure of the clamping device or member to which it is clamped. Further, many such clamping devices do not readily allow the amount of preload placed on the member to be controlled. This may present a problem since excess preload placed in the member being clamped, for example, a bearing assembly or the like, may result in failure. Such clamping devices are often costly or difficult to manufacture or assemble into the devices in which they are employed. For instance, the installation of existing clamping devices often requires expensive fixtures to ensure that the member being clamped is properly secured.

Consequently, it would be advantageous to provide a clamp assembly that is capable of clamping a member without inducing stress concentrations in the member, and allows control of the amount of preload placed in the member. Further, it is desirable that the clamp assembly be inexpensively and easily produced.

SUMMARY OF THE INVENTION

Accordingly, the present invention is directed to a deformable wedge clamp assembly suitable for clamping members such as shafts, bearing assemblies, and the like. In exemplary embodiments, the clamp assembly includes a body having first and second apertures formed therein, the first aperture being suitable for receiving a fastener and the second aperture being suitable for receiving a member to which the body is to be attached and a wedge assembly disposed in the body adjacent to the first and second apertures. To clamp the clamp assembly to a member, a fastener is inserted into the first aperture, deforming the body so that the wedge assembly is moved against the member received in the second aperture. By controlling the shape of the wedge assembly, the clamp assembly may be made capable of securely clamping the member with a controlled amount of preload without inducing unnecessary stress concentrations in the member.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
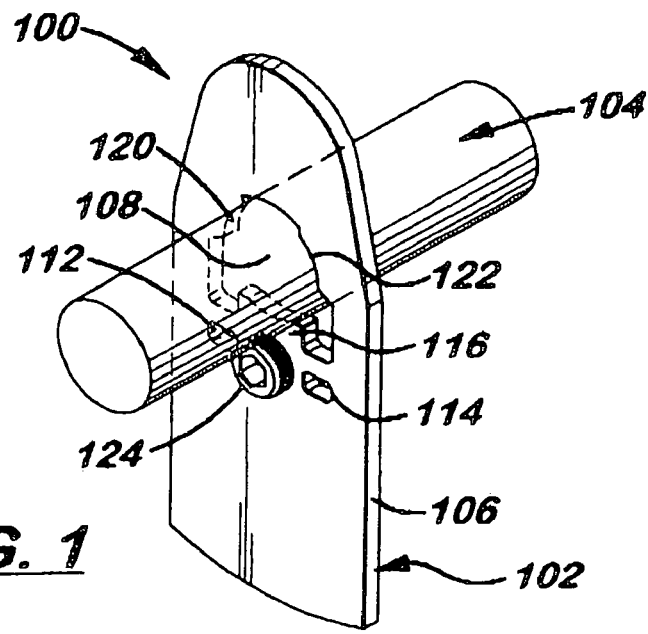
FIG. 1 is an isometric view illustrating an eccentric employing a clamp assembly in accordance with an exemplary embodiment of the present invention.

Reference will now be made in detail to the presently preferred embodiments of the invention, examples of which are illustrated in the accompanying drawings.

FIGS. 1 through 4 illustrate an eccentric employing an integrally formed deformable wedge clamp assembly in accordance with an exemplary embodiment of the present invention. In the embodiment shown, the deformable wedge clamp assembly 100 is utilized for coupling the eccentric 102 to a generally cylindrical member 104 of a crankshaft, driveshaft, or the like. The deformable wedge clamp assembly 100 is comprised of a body 106 having apertures 108, 110, 112 & 114 formed therein, which define a wedge assembly 116 disposed in body 106 generally between apertures 108 & 110.

Aperture 108 includes a generally cylindrical portion 118 sized and shaped for receiving cylindrical member 104. Supports 120 & 122 extend into cylindrical portion 118 for engaging member 104 to hold cylindrical member 104 in aperture 108. Preferably, the outer ends of wedge assembly 116 and supports 120 & 122 are shaped to uniformly engage member 104 so that the deformable wedge clamp assembly 100 may securely clamp the member 104 with a controlled amount of preload and without inducing unnecessary stress concentrations in the member 104. For instance, as shown in FIGS. 1 through 4, the outer ends of wedge assembly 116 and supports 120 & 122 may comprise a curved surface suitable for being driven against cylindrical member 104.

A fastener 124 is inserted in aperture 110 for causing wedge assembly 116 to engage the member 104 received therein. In exemplary embodiments of the invention, aperture 110 may be threaded for receiving a threaded fastener 124 such as a screw, threaded plug, or the like. When threaded into aperture 110, fastener 124 forces wedge assembly 116 into aperture 108 causing wedge assembly 116 to engage the cylindrical member 104 received therein. As fastener 124 is further threaded into aperture 110, wedge assembly 116 is driven against member 104, clamping the eccentric 102 to the member 104.

Figure 2:
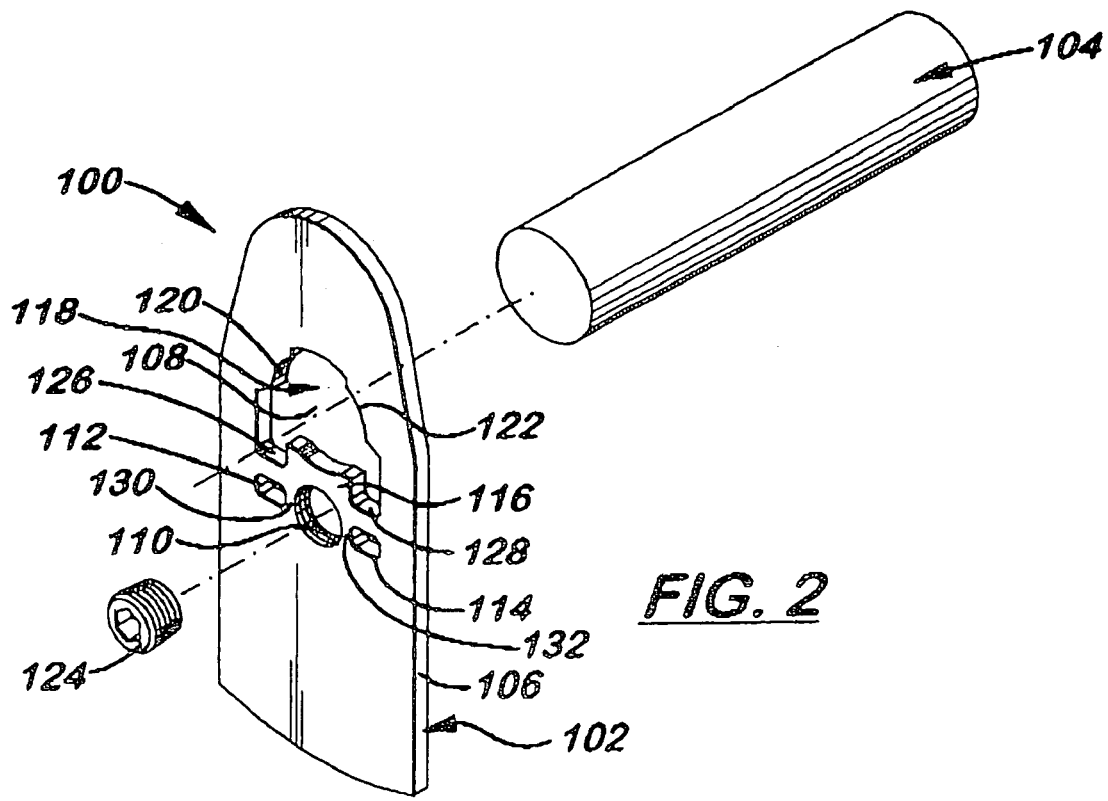
FIG. 2 is an exploded isometric view illustrating components of the eccentric shown in FIG. 1.
Figure 3:
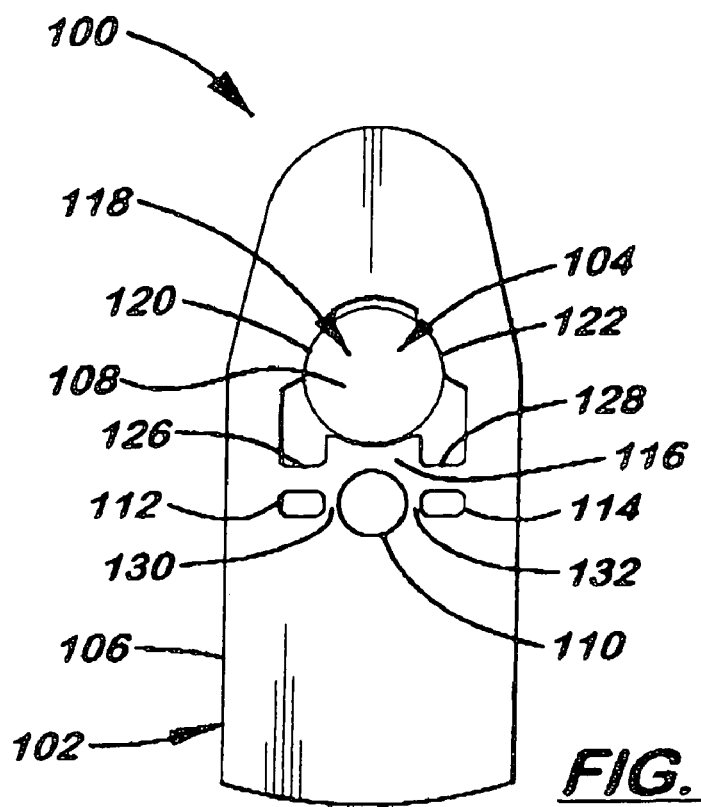
FIGS. 3 and 4 are side elevational views illustrating application of the clamp assembly shown in FIGS. 1 and 2.
Figure 4:
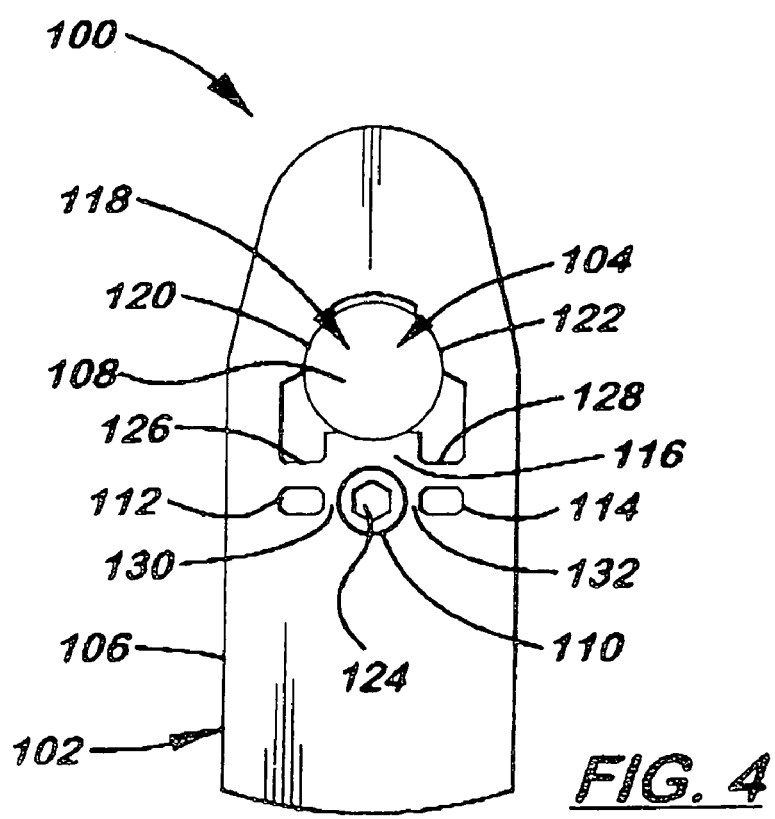

As shown in FIG. 2, aperture 110 may further be tapered or conical in shape for receiving a tapered fastener 124. In this manner, the distance that wedge assembly 116 is moved into aperture 108 by fastener 124, and thus the amount of preload placed on member 104 by wedge assembly 116 and supports 120 & 122, may be accurately controlled by selecting the amount of fastener 124 that is threaded into aperture 110.

Apertures 108, 110, 112 & 114 define bending members 126 & 128 and tensile members 130 & 132 for supporting the wedge assembly 116 in plane within body 106. As fastener 124 is threaded into aperture 110, members 126, 128, 130 & 132 deform to allow movement of wedge assembly 116 into aperture 108. For instance, in the embodiment shown in FIGS. 3 and 4, insertion of the fastener into the first aperture causes bending of bending members 126 & 128 so that wedge assembly 116 is forced against member 104. The bending deformation in members 126 & 128 places tensile members 130 & 132 in tension. This tension may cause plastic deformation of tensile members 130 & 132. In embodiments of the invention, this plastic deformation of tensile members 130 & 132 may proceed to the point where one or both of the tensile members 130 & 132 yield or break so that the wedge assembly 116 may be further forced against member 104. In such embodiments, fastener 124 is retained in aperture 110 after failure of one or more of the tensile members 130 & 132.

Referring now to FIGS. 5 through 8, a bearing support employing an integrally formed deformable wedge clamp assembly in accordance with an exemplary embodiment of the present invention is described. In the embodiment shown, the deformable wedge clamp assembly 200 is utilized for securing a bearing assembly 202 within the bearing support 204. The deformable wedge clamp assembly 200 is comprised of a body 206 having apertures 208 & 210 formed therein, which define a wedge assembly 212 disposed in body 206 generally adjacent to and between apertures 208 & 210. In exemplary embodiments, wedge assembly 212 includes a clamping portion 214 suitable for being driven against the bearing assembly 202 and a deformation portion 216 capable of deforming for allowing movement of the clamping portion 214.

Aperture 208 is generally cylindrical in shape and is sized for receiving bearing assembly 202. Preferably, the surface of wedge assembly 212 forms at least a portion of the outer wall of aperture 210 and has a curved surface for uniformly engaging bearing assembly 202 so that the bearing assembly 202 may be securely clamped within the bearing support 204 with a controlled amount of preload and without formation of unnecessary stress concentrations.

In the exemplary embodiment shown, aperture 210 includes a fastener receiving portion 218 suitable for receiving a fastener 220 and a curvilinear portion 222 separating the wedge assembly 212 from the body 206 so that the wedge assembly 212 is capable of movement into aperture 208. Fastener 220 is inserted into the fastener receiving portion 218 of aperture 210 causing wedge assembly 212 to engage the bearing assembly 202 received in aperture 208. In exemplary embodiments of the invention, the fastener receiving portion 218 of aperture 210 may be threaded for receiving a threaded fastener 220 such as a screw, threaded plug, or the like. When threaded into fastener receiving portion 218, fastener 220 forces wedge assembly 212 to bend about deformation portion 216 into aperture 208 to engage bearing assembly 202. As fastener 220 is further threaded into fastener receiving portion 218, wedge assembly 212 is driven against the outer surface of the bearing assembly 202, clamping the bearing assembly 202 in the bearing assembly support.

Figure 5:
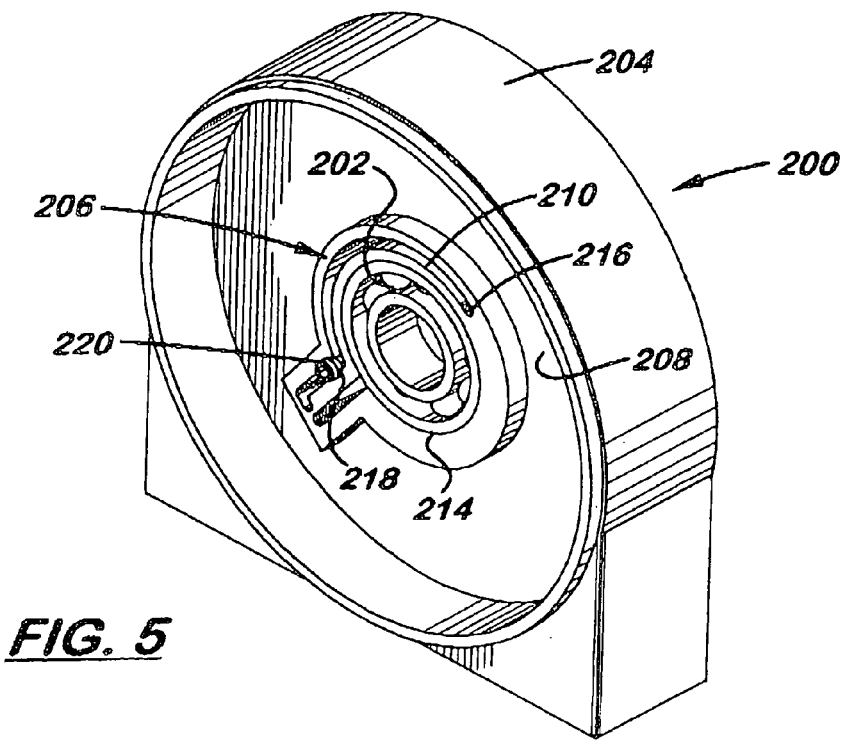
FIG. 5 is an isometric view illustrating bearing support employing a clamping assembly in accordance with an exemplary embodiment of the present invention.
Figure 6:
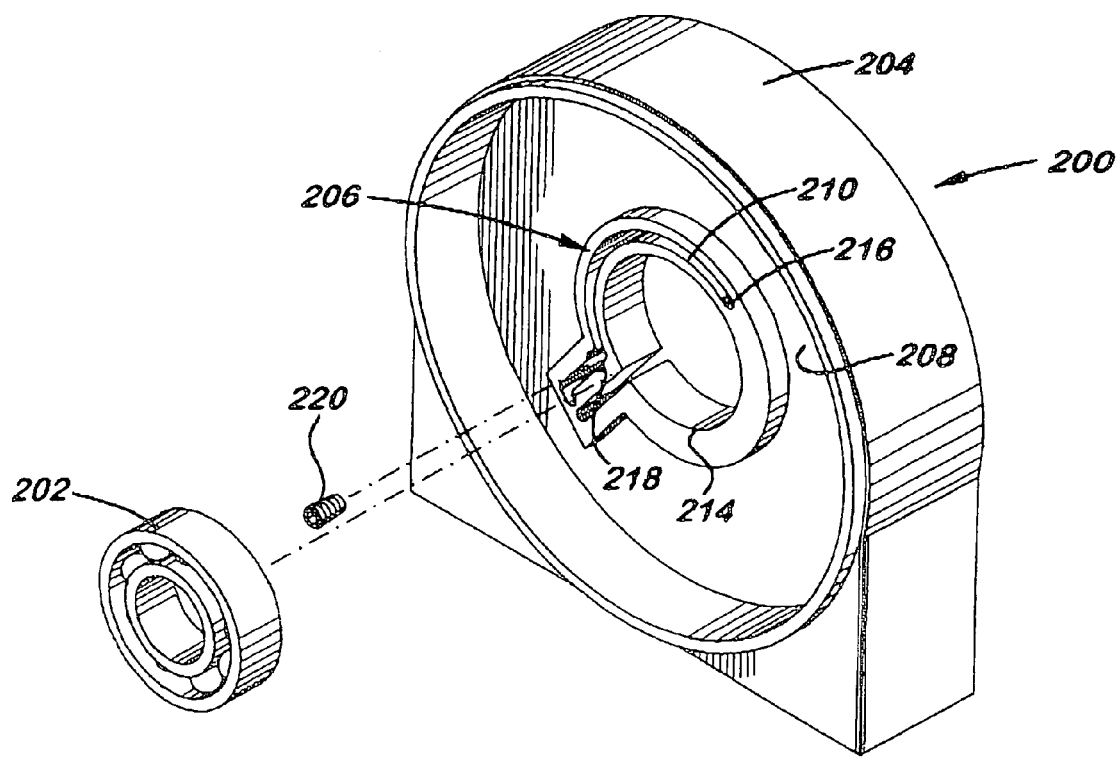
FIG. 6 is an exploded isometric view illustrating components of the bearing support shown in FIG. 4.
Figure 7:
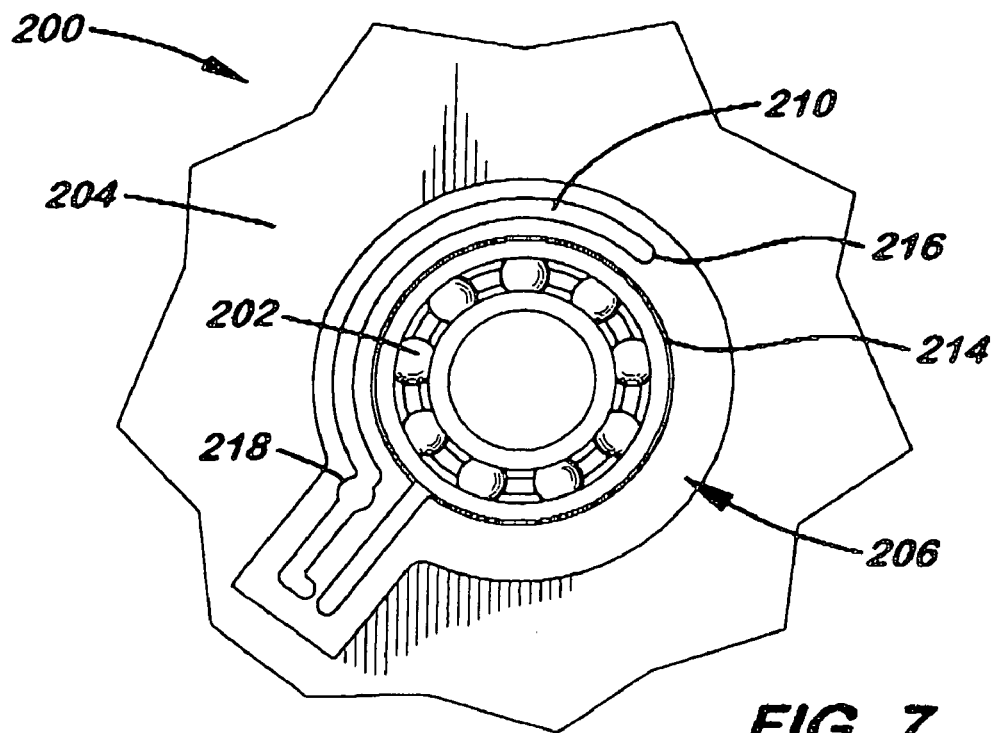
FIGS. 7 and 8 are side elevational views illustrating application of the clamp assembly shown in FIGS. 5 and 6.
Figure 8:
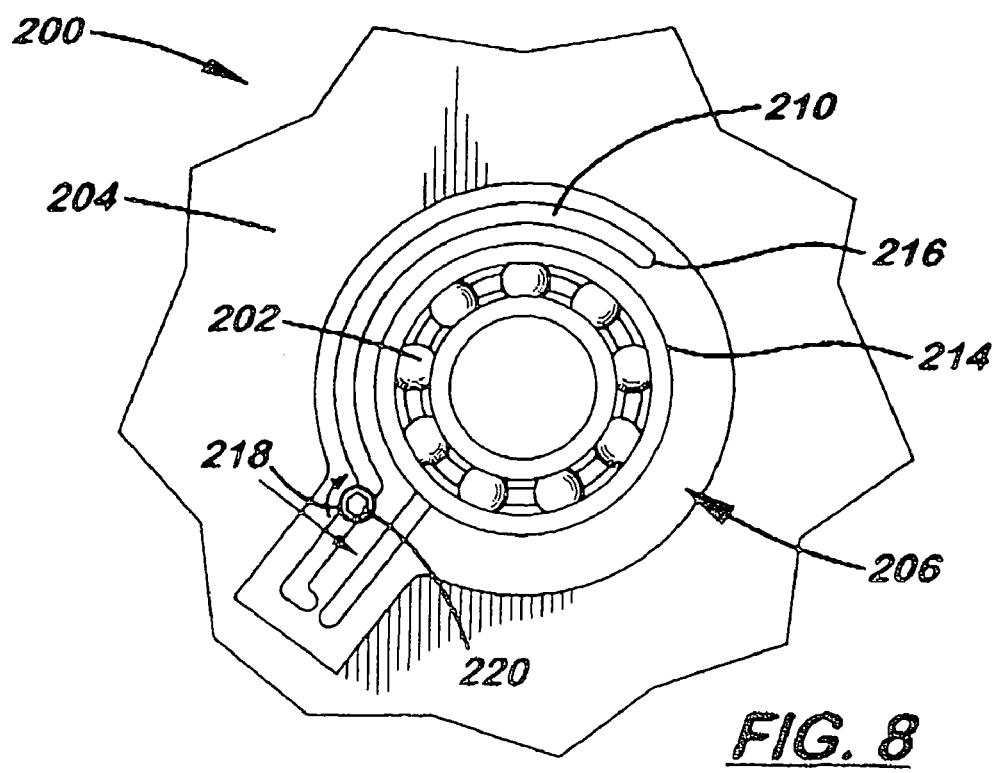

As shown in FIG. 5, the fastener receiving portion 218 of aperture 210 may further be tapered or conical in shape for receiving a tapered fastener 220. In this manner, the distance that wedge assembly 212 is moved into aperture 208 by fastener 220, and thus the amount of preload placed on bearing assembly 202 by wedge assembly 212, may be accurately controlled by selecting the amount of fastener 220 that is threaded into the fastener receiving portion 218 of aperture 210.

It is believed that the deformable wedge clamp assembly of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A clamp assembly, comprising:
   a body having first and second apertures formed therein, the first aperture being suitable for receiving a fastener and the second aperture being suitable for receiving a member to which the body is to be attached, and third and fourth apertures adjacent to the first aperture, the first, second, third and forth apertures forming first and second bending members and first and second tensile members, the first and second bending members and first and second tensile members being suitable for supporting the wedge assembly; and
   a wedge assembly disposed in the body adjacent to the first and second apertures;
   wherein insertion of a fastener into the first aperture is capable of deforming the body for moving the wedge assembly against the member received in the first aperture to clamp the body to the member.

2. The clamp assembly as claimed in claim 1, wherein the first aperture is tapered for receiving a tapered fastener.

3. The clamp assembly as claimed in claim 1, wherein the first aperture is threaded for receiving a threaded fastener.

4. The clamp assembly as claimed in claim 1, wherein the wedge assembly comprises a curved surface suitable for being driven against a curved member.

5. The clamp assembly as claimed in claim 1, wherein insertion of the fastener into the first aperture causes bending of the first and second bending members so that the wedge assembly is forced against the member.

6. The clamp assembly as claimed in claim 5, wherein insertion of the fastener into the first aperture further causes yielding of the first and second tensile members so that the wedge assembly is forced against the member.

7. The clamp assembly as claimed in claim 5, wherein the first aperture is tapered for receiving a tapered fastener.

8. The clamp assembly as claimed in claim 5, wherein the first aperture is threaded for receiving a threaded fastener.

9. The clamp assembly as claimed in claim 1 wherein the wedge assembly comprises a curved surface suitable for being driven against a curved member.

10. A clamp assembly, comprising:
    a body having first, second, third and fourth apertures formed therein, the first aperture being suitable for receiving a fastener and the second aperture being suitable for receiving a member to which the body is to be attached; and
    a wedge assembly disposed in the body adjacent to the first and second apertures;
    wherein the first, second, third and forth apertures form first and second bending members and first and second tensile members, the first and second bending members and first and second tensile members being suitable for supporting the wedge assembly so that insertion of a fastener into the first aperture is capable of moving the wedge assembly against a member received in the first aperture for clamping the body to the member.

11. The clamp assembly as claimed in claim 10, wherein insertion of the fastener into the first aperture causes bending of the first and second bending members so that the wedge assembly is forced against the member.

12. The clamp assembly as claimed in claim 11, wherein insertion of the fastener into the first aperture further causes yielding of the first and second tensile members so that the wedge assembly is forced against the member.

13. The clamp assembly as claimed in claim 11, wherein the first aperture is tapered for receiving a tapered fastener.

14. The clamp assembly as claimed in claim 11, wherein the first aperture is threaded for receiving a threaded fastener.

15. The clamp assembly as claimed in claim 10, wherein the wedge assembly comprises a curved surface suitable for being driven against a curved member.

16. The clamp assembly as claimed in claim 15, wherein the fastener receiving portion of the first aperture is threaded for receiving a threaded fastener.

\* \* \* \* \*